United States Patent
Ito

(10) Patent No.: US 10,353,196 B2
(45) Date of Patent: Jul. 16, 2019

(54) ELECTRO-OPTICAL DEVICE, METHOD OF MANUFACTURING ELECTRO-OPTICAL DEVICE, AND ELECTRONIC APPARATUS

(71) Applicant: SEIKO EPSON CORPORATION, Tokyo (JP)

(72) Inventor: Satoshi Ito, Eniwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/867,178

(22) Filed: Jan. 10, 2018

(65) Prior Publication Data

US 2018/0129037 A1    May 10, 2018

Related U.S. Application Data

(63) Continuation of application No. 15/059,707, filed on Mar. 3, 2016, now Pat. No. 9,897,798.

(30) Foreign Application Priority Data

Apr. 1, 2015    (JP) .................. 2015-074871

(51) Int. Cl.
  *G02B 26/00*    (2006.01)
  *G02B 26/08*    (2006.01)
  *G02F 1/29*    (2006.01)

(52) U.S. Cl.
  CPC ....... *G02B 26/0833* (2013.01); *G02B 26/008* (2013.01)

(58) Field of Classification Search
  CPC ............. G02B 26/0841; G02B 26/085; G02B 26/0833; G02B 1/02; G02B 26/008; G02B 26/0808; G02B 26/0866; G02B 26/0875; G02B 26/0858
  USPC ................ 359/237, 242, 265–267, 270–273, 359/290–292, 295, 298, 315, 321, 322
  See application file for complete search history.

(56) References Cited

U.S. PATENT DOCUMENTS

| | | | |
|---|---|---|---|
| 5,083,857 A | 1/1992 | Hornbeck | |
| 5,454,906 A | 10/1995 | Baker et al. | |
| 5,600,383 A | 2/1997 | Hornbeck | |
| 5,631,782 A | 5/1997 | Smith et al. | |
| 5,650,881 A * | 7/1997 | Hornbeck | B81B 3/0072 348/771 |
| 5,703,728 A | 12/1997 | Smith et al. | |

(Continued)

FOREIGN PATENT DOCUMENTS

| | | |
|---|---|---|
| JP | H05-196880 A | 8/1993 |
| JP | H08-227042 A | 9/1996 |

(Continued)

*Primary Examiner* — Brandi N Thomas
(74) *Attorney, Agent, or Firm* — Oliff PLC

(57) ABSTRACT

An electro-optical device is configured by a laminated body of a second conductive layer and a reflective layer for a mirror. The second conductive layer includes a mirror support post facing a concave portion at a side opposite to a substrate, and a flat plate which extends from an end portion of the mirror support post and faces the substrate. The concave portion is filled with the resin. Surfaces of the flat plate and the resin configure a continuous plane. The reflective layer for a mirror is laminated on a surface of the resin at a side opposite to the substrate, and a surface of the flat plate of the second conductive layer at a side opposite to the substrate.

10 Claims, 9 Drawing Sheets

(56) References Cited

U.S. PATENT DOCUMENTS

| | | |
|---|---|---|
| 5,757,539 A | 5/1998 | Min |
| 6,861,277 B1 | 3/2005 | Monroe et al. |
| 7,354,865 B2 | 4/2008 | DiCarlo et al. |
| 7,502,158 B2 * | 3/2009 | Yang ................. G02B 26/0841 359/290 |
| 2005/0106772 A1 | 5/2005 | Monroe et al. |
| 2005/0275930 A1 * | 12/2005 | Patel ................. G02B 26/0841 359/291 |
| 2007/0097485 A1 * | 5/2007 | Yang ................. G02B 26/0841 359/290 |
| 2007/0097486 A1 | 5/2007 | Yang et al. |
| 2007/0097487 A1 | 5/2007 | Yang et al. |
| 2008/0220552 A1 | 9/2008 | Pan |
| 2008/0297874 A1 | 12/2008 | Pan |
| 2009/0002805 A1 | 1/2009 | Yang et al. |
| 2009/0067025 A1 | 3/2009 | Atnip et al. |
| 2010/0112492 A1 | 5/2010 | Yang et al. |
| 2012/0171623 A1 | 7/2012 | Yang et al. |
| 2013/0241967 A1 | 9/2013 | Nishimura et al. |

FOREIGN PATENT DOCUMENTS

| | | |
|---|---|---|
| JP | H11-503843 A | 3/1999 |
| JP | 2005-115370 A | 4/2005 |
| JP | 2007-25505 A | 2/2007 |
| JP | 2007-510174 A | 4/2007 |
| JP | 2009-14029 A | 1/2009 |
| JP | 2009-198700 A | 9/2009 |
| JP | 2010-181586 A | 8/2010 |

* cited by examiner

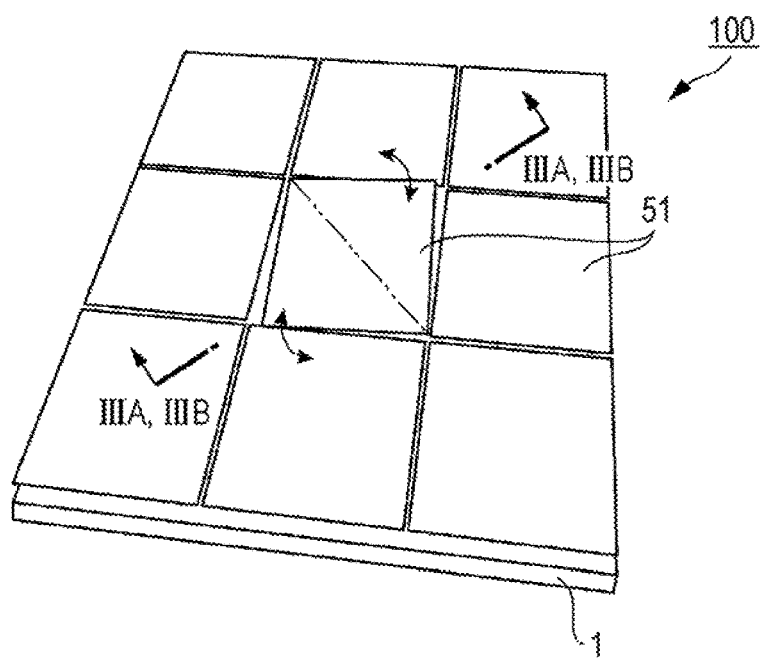
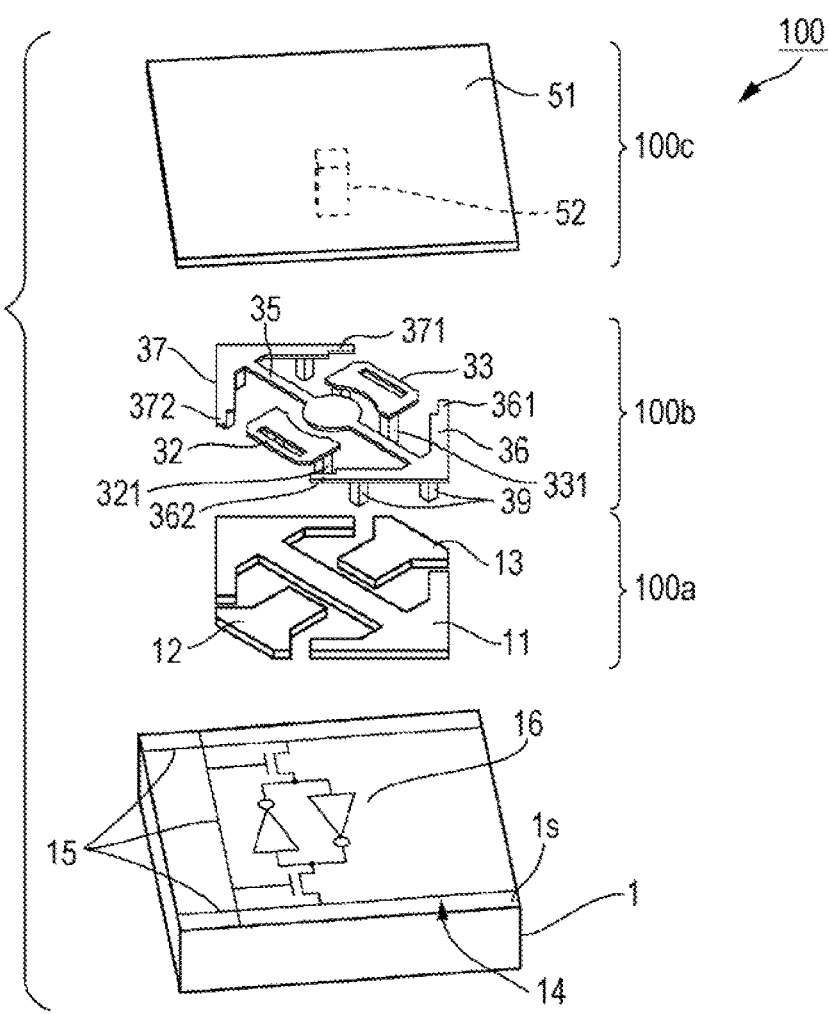

ST1, ST2

ST3

ST4, ST5

ST6

ST7

ST8

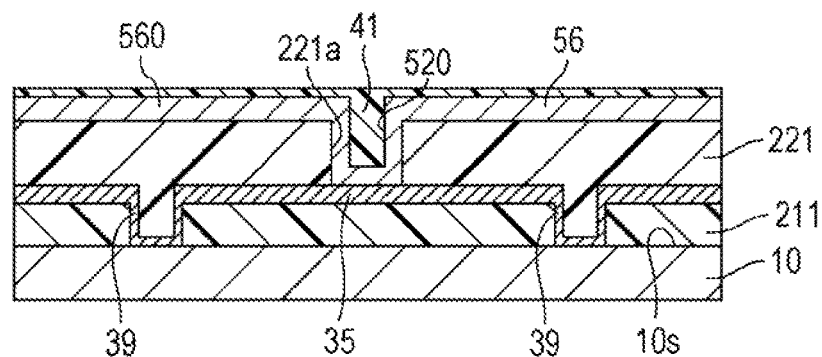
FIG. 6A ST9
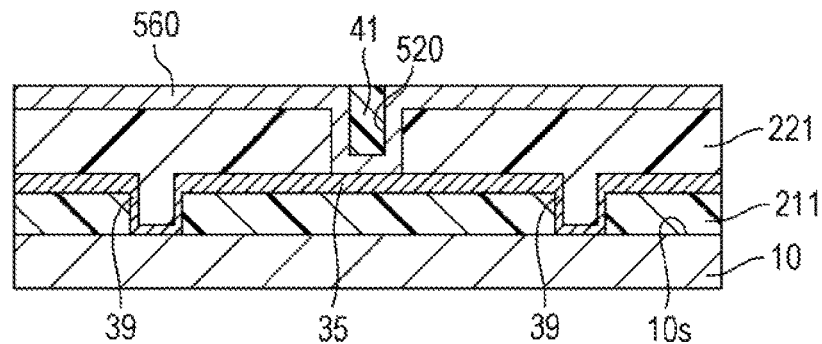
FIG. 6B ST10
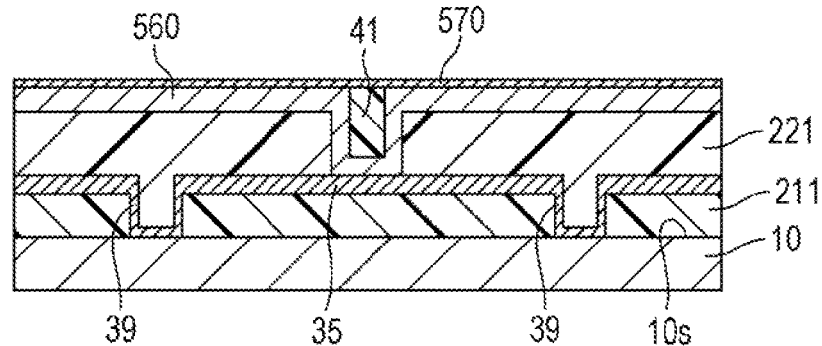
FIG. 6C ST11

ST12

ST13

ST14, ST15

ST16

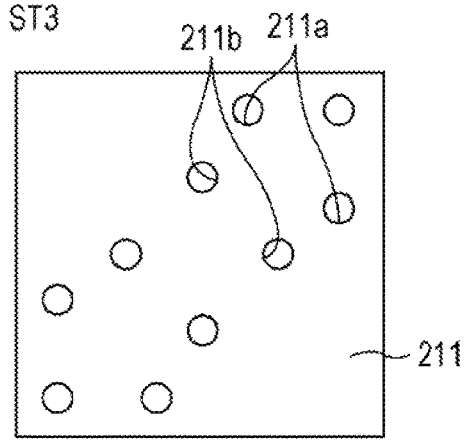
FIG. 8A ST3
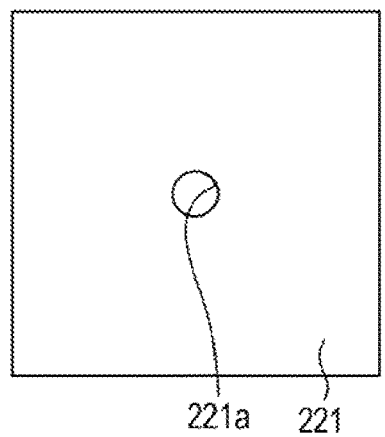
FIG. 8D ST7
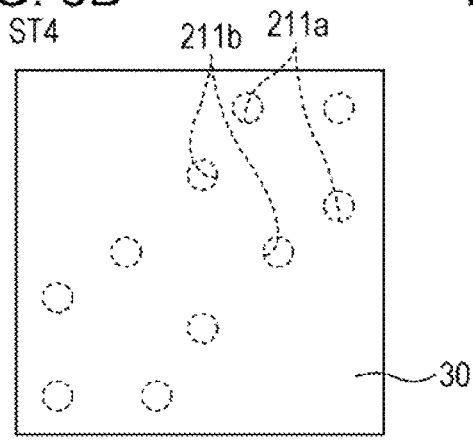
FIG. 8B ST4
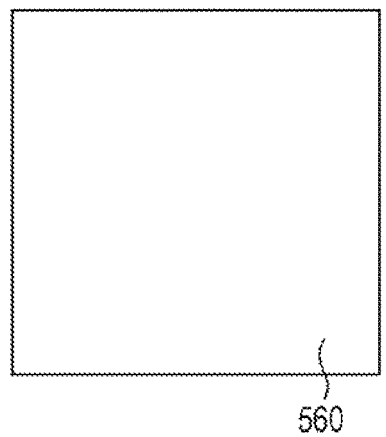
FIG. 8E ST8
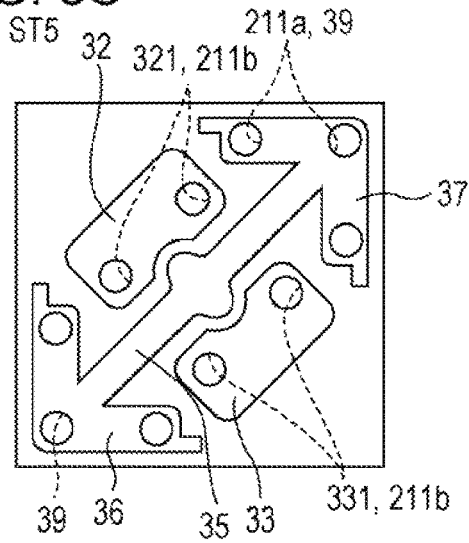
FIG. 8C ST5
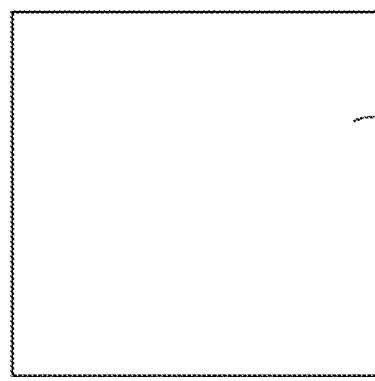
FIG. 8F ST9

ST10

ST11

ST12

ST13

ST14

ELECTRO-OPTICAL DEVICE, METHOD OF MANUFACTURING ELECTRO-OPTICAL DEVICE, AND ELECTRONIC APPARATUS

CROSS-REFERENCE TO RELATED APPLICATIONS

The present application is a continuation application of U.S. patent application Ser. No. 15/059,707, filed on Mar. 3, 2016, which claims priority to Japanese Patent Application JP 2015-074871, filed Apr. 1, 2015. The entire disclosures of each of the above are hereby incorporated by reference herein.

BACKGROUND

1. Technical Field

Various embodiments of the present invention relate to an electro-optical device including a mirror, a method of manufacturing the electro-optical device, and an electronic apparatus.

2. Related Art

For example, a projection display device, which modulates light emitted from a light source using a plurality of mirrors (micro mirrors) of an electro-optical device called a digital mirror device (DMD), enlarges the modulated light to project using a projection optical system, thereby displaying an image onto a screen, is known as an electronic apparatus. In the electro-optical device which is used for the electronic apparatus, the mirror is supported by a torsion hinge (twist hinge) through a mirror support post (mirror post), and is electrically coupled to the torsion hinge. In addition, the torsion hinge is supported by a bias electrode on a substrate side which is formed in the substrate through a hinge support post, and is electrically coupled to the bias electrode on a substrate side. Thus, while a bias voltage is applied to the mirror from the bias electrode on a substrate side, if a drive voltage is applied to an address electrode, it is possible to drive the mirror using an electrostatic force which is generated between the mirror and the address electrode.

Here, if the mirror support post faces the concave portion at a side opposite to the substrate, a large dent is formed on a surface of the mirror, and thereby reflectance of the surface (reflective surface) of the mirror decreases. Thus, a technology, in which an inorganic material is accumulated to a surface of the mirror post, the sacrificial layer or the like, the surface is ground, and thereafter the reflective film that forms the mirror is formed, is proposed (refer to JP-T-2007-510174 and JP-A-2005-115370).

However, in order to fill a concave portion with an inorganic material, it is necessary to quite thickly accumulate the inorganic material, and in a case of the inorganic material, grinding speed is decreased, and thus a long processing time is required to grind the inorganic material for removal from a surface of a sacrificial layer or the like.

SUMMARY

An advantage of some aspects of the invention is to provide an electro-optical device in which a concave portion of a mirror support post (mirror post) is efficiently filled and which prevents a large dent from being formed on a surface of the mirror, a method of manufacturing the electro-optical device, and an electronic apparatus.

According to one aspect of the invention, there is provided an electro-optical device including: a substrate; a first conductive layer which includes a first support post (hinge post) that protrudes toward the substrate at a side of the substrate and that is supported by the substrate, and a torsion hinge (twist hinge) a second conductive layer for a mirror which includes a second support post (mirror support post) that faces a concave portion at a side opposite to the substrate and protrudes toward a side opposite to the substrate from the torsion hinge, and a flat plate that extends from an end portion located at a side of the second support post opposite to the substrate and faces the substrate; a resin which fills an inner side of the concave portion; and a reflective layer for a mirror which is laminated on a surface of the resin at a side opposite to the substrate and a surface of the flat plate at a side opposite to the substrate, and configures a mirror together with the second conductive layer for a mirror.

In one or more embodiments of the invention, the second support post faces the concave portion at a side opposite to the substrate, but the concave portion is filled with the resin, and thus a large dent is hardly formed on the surface of the mirror. Accordingly, it is possible to increase utilization efficiency of light, and to prevent contrast from lowering due to scattering at the mirror. In addition, in a case in which the concave portion is filled with the resin, the concave portion can be intensively filled, and thus a planarization step can be omitted. In addition, even in a case in which the planarization step cannot be omitted, the resin formed on a surface of the sacrificial layer formed around the concave portion is thinned, and if the resin is used, a grinding speed is increased. Thus, the concave portion of the second support post can be efficiently filled, and it is possible to prevent a large dent from being formed on the surface of the mirror.

In the electro-optical device, it is preferable that a height difference between a height from the torsion hinge to a surface of the resin at a side opposite to the substrate, and a height from the torsion hinge to a surface of the flat plate at a side opposite to the substrate is equal to or less than 0.2 µm. With a difference of such a degree, a decrease of utilization efficiency of light and a decrease of contrast due to scattering at a mirror is not noticeable.

In the electro-optical device, it is preferable that a surface of the resin at a side opposite to the substrate and a surface of the flat plate at a side opposite to the substrate configure a continuous plane.

In the electro-optical device, it is preferable that the second conductive layer for a mirror is thicker than the reflective layer for a mirror. According to the configuration, it is possible to reliably apply a proper potential to the mirror.

Even in this case, it is preferable that the sum of the thicknesses of the second conductive layer for a mirror and the reflective layer for a mirror is from 0.2 µm to 0.5 µm.

In the electro-optical device, it is preferable that the resin has conductivity. According to the configuration, it is possible to reliably apply a proper potential to the mirror.

In the electro-optical device, it is preferable that the resin is formed of a photosensitive resin. According to the configuration, it is possible to make the resin selectively remain in an arbitrary position.

According to another aspect of the invention, there is provided a method of manufacturing an electro-optical device including: forming a first sacrificial layer in which a first opening (opening for an hinge post) is provided at a side of a substrate; forming a first conductive film at a side of the first sacrificial layer opposite to the substrate and an internal side of the first opening; forming a torsion hinge (twist hinge) which includes a first support post (hinge post) that is configured by the first conductive film formed on an internal side of the first opening, by patterning the first conductive film; forming a second sacrificial layer in which a second opening (opening for a mirror support post) is provided at a side of the torsion hinge opposite to the substrate; forming a second conductive film at a side of the second sacrificial layer opposite to the substrate and an internal side of the second opening; filling a concave portion which is formed in the second conductive film by the second opening with a resin; forming a reflective metal film on surfaces of the second conductive film and the resin at a side opposite to the substrate; and forming a mirror by patterning the second conductive film and the reflective metal film.

In the method of manufacturing an electro-optical device, it is preferable that planarizing surfaces of the second conductive film and the resin at a side opposite to the substrate, between the filling and the forming of the reflective metal film is further included.

In the method of manufacturing an electro-optical device, it is preferable that, in the filling, the concave portion is coated with a liquid resin material and thereafter the resin material is cured.

An electro-optical device which employs one or more embodiments of the invention can be used for various types of electronic apparatuses, and in this case, a light source unit which emits light source light to the mirror is provided in the electronic apparatus. In addition, if a projection type display device or a head-mounted display device is configured as the electronic apparatus, a projection optical system which projects the light modulated by the mirror is further provided in the electronic apparatus.

BRIEF DESCRIPTION OF THE DRAWINGS

Various embodiments of the invention will be described with reference to the accompanying drawings, wherein like numbers reference like elements.

FIGS. 2A and 2B are explanatory views schematically illustrating a basic configuration of an electro-optical device which employs an embodiment of the invention.

FIGS. 6A to 6C are step sectional views illustrating a manufacturing method of the electro-optical device which employs an embodiment of the invention.

FIGS. 8A to 8F are plan views of layers formed by manufacturing steps of the electro-optical device which employs an embodiment of the invention.

DESCRIPTION OF EXEMPLARY EMBODIMENTS

Figure 1:
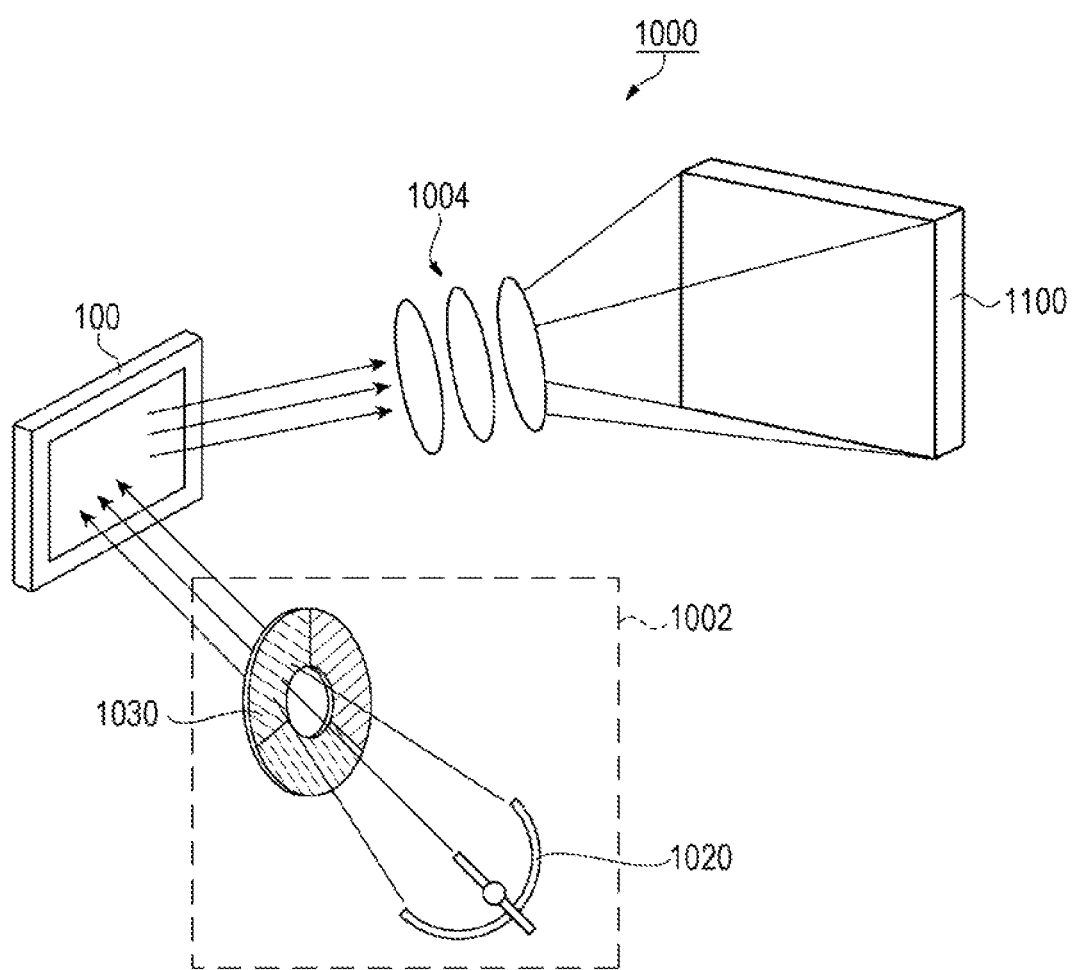
FIG. 1 is a schematic view illustrating an optical system of a projection type display device serving as an electronic apparatus which employs an embodiment of the invention.

Embodiments of the invention will be described with reference to the drawings. In the following description, a projection type display device serving as an electronic apparatus which employs one or more embodiments of the invention will be described. In addition, in the figures referred to by the following description, each layer and each member is illustrated in a recognizable size in the figures, and scales are different from each other for each layer and each member. In addition, the number of mirrors or the like is reductively illustrated in the drawings.

Projection Type Display Device Serving as Electronic Apparatus

FIG. 1 is a schematic view illustrating an optical system of a projection type display device serving as an electronic apparatus which employs one or more embodiments of the invention. The projection type display device 1000 illustrated in FIG. 1 includes a light source unit 1002, an electro-optical device 100 which modulates light emitted from the light source unit 1002 in response to image information, and a projection optical system 1004 which projects the light modulated by the electro-optical device 100 onto an image-projected body 1100 such as a screen as a projection image. The light source unit 1002 includes a light source 1020 and a color filter 1030. The light source 1020 emits white light, the color filter 1030 emits lights of various colors in accordance with rotation, and the electro-optical device 100 modulates the incident light at a timing synchronous to the rotation of the color filter 1030. Instead of the color filter 1030, a phosphor substrate, which converts the light emitted from the light source 1020 into lights of various colors, may be used. In addition, the light source unit 1002 and the electro-optical device 100 may be provided for each light of various colors.

Basic Configuration of Electro-Optical Device 100

FIGS. 2A and 2B are explanatory views schematically illustrating a basic configuration of the electro-optical device 100 which employs one or more embodiments of the invention, and FIGS. 2A and 2B are respectively an explanatory view illustrating a principal portion of the electro-optical device 100 and an exploded perspective view of a principal portion of the electro-optical device 100.

Figure 3A:
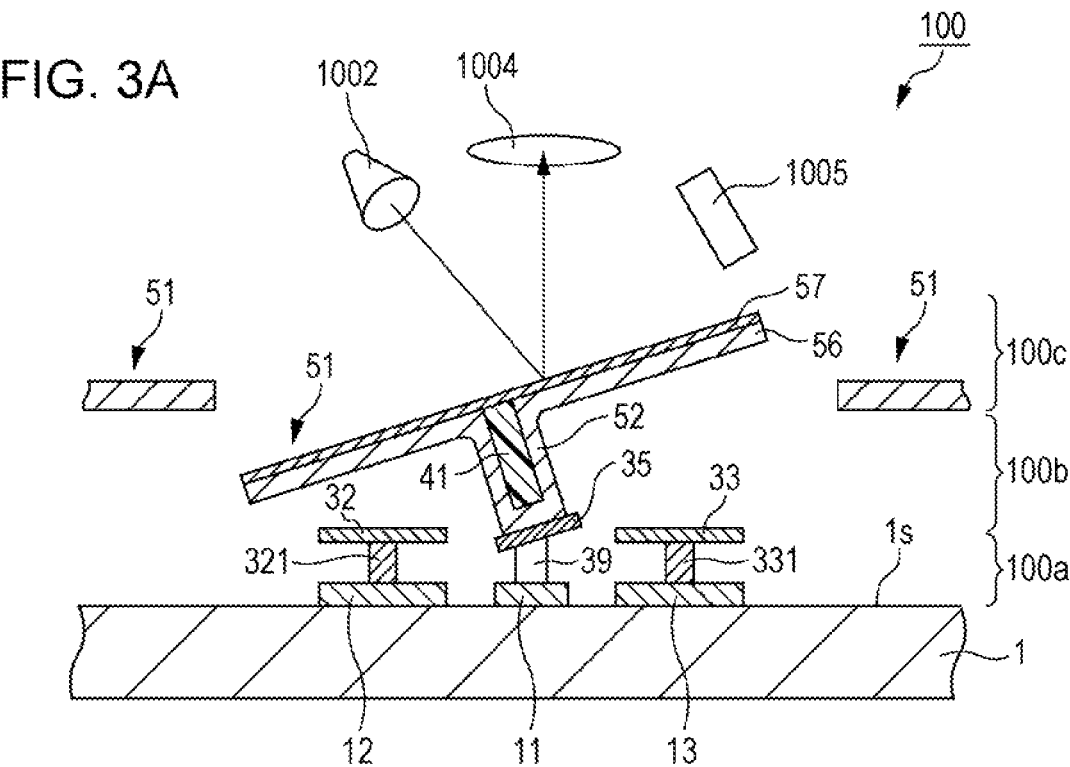
FIGS. 3A and 3B are explanatory views schematically illustrating cross sections IIIA-IIIA and IIIB-IIIB of a principal portion of the electro-optical device which employs an embodiment of the invention.
Figure 3B:
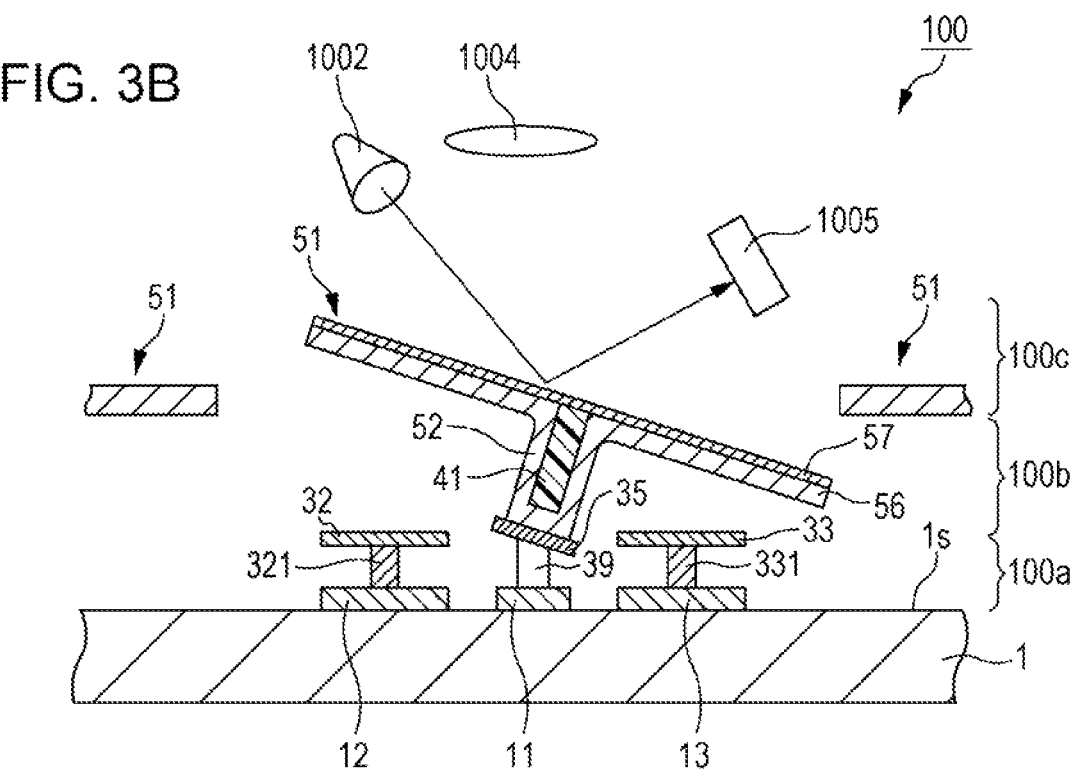

FIGS. 3A and 3B are explanatory views schematically illustrating cross sections IIIA-IIIA and IIIB-IIIB of the principal portion of the electro-optical device 100 which employs one or more embodiments of the invention, and FIGS. 3A and 3B are respectively an explanatory view schematically illustrating a state in which a mirror is tilted to one side, and an explanatory view schematically illustrating a state in which the mirror is tilted to the other side.

As illustrated in FIGS. 2A and 2B and FIGS. 3A and 3B, in the electro-optical device 100, a plurality of mirrors 51 are disposed over one surface is of a substrate 1 in a matrix, and the mirrors 51 are separated from the substrate 1. The substrate 1 is, for example, a silicon substrate. For example, each of the mirrors 51 is a micro mirror having a plane size in which a length of one side thereof is, for example, 10 µm to 30 µm. The mirrors 51 are arranged with a size of, for example, 600×800 to 1920×1080, and one mirror 51 corresponds to one pixel of an image.

A surface of the mirror 51 is configured by a reflective surface which is formed of a reflective metal film such as aluminum. The electro-optical device 100 includes a first portion 100a having a bias electrode 11 on the substrate side which is formed on one surface is of the substrate 1, and address electrodes 12 and 13 on the substrate side, a second portion 100b having upper address electrodes 32 and 33 and a torsion hinge (twist hinge) 35, and a third portion 100c having the mirrors 51. An address circuit 14 is formed on the substrate 1 in the first portion 100a. The address circuit 14 includes a memory cell for selectively controlling an operation of each mirror 51, lines 15 such as a word line and a bit line, or the like. A random access memory (RAM) having a CMOS circuit 16 includes a circuit configuration similar thereto.

The second portion 100b includes the upper address electrodes 32 and 33, the torsion hinge 35, and a mirror support post (second support post) 52. The upper address electrodes 32 and 33 are electrically coupled to the address electrodes 12 and 13 on the substrate side through electrode posts 321 and 331, and are supported by the address electrodes 12 and 13 on the substrate side. Hinge arms 36 and 37 extend from both ends of the torsion hinge 35. The hinge arms 36 and 37 are electrically coupled to the bias electrode 11 on the substrate side through a hinge support post (first support post) 39, and are supported by the bias electrode 11 on the substrate side. The mirrors 51 are electrically coupled to the torsion hinge 35 through the mirror support post 52, and are supported by the torsion hinge 35. Thus, the mirrors 51 are electrically coupled to the bias electrode 11 on the substrate side through the mirror support post 52, the torsion hinge 35, the hinge arms 36 and 37, and the hinge support post 39, and receive a bias voltage which is applied from the bias electrode 11 on the substrate side. Stoppers 361, 362, 371, and 372, which come into contact with the mirrors 51 when the mirrors 51 tilt and prevent the mirrors 51 from coming into contact with the upper address electrodes 32 and 33, are formed in tips of the hinge arms 36 and 37.

A drive element, which drives the mirrors 51 to tilt by generating an electrostatic force, is configured between the address electrodes 12 and 13 on the substrates side and the upper address electrodes 32 and 33, and the mirrors 51. Specifically, as illustrated in FIGS. 3A and 3B, a drive voltage is applied to the address electrodes 12 and 13 on the substrates side and the upper address electrodes 32 and 33, and thereby when the mirrors 51 tilt toward the address electrode 12 and the upper address electrode 32, or the address electrode 13 and the upper address electrode 33, the torsion hinge 35 is twisted. Thus, when application of the drive voltage to the address electrodes 12 and 13 on the substrates side and the upper address electrodes 32 and 33 is stopped and thereby a pulling force for the mirrors 51 is lost, the mirrors 51 exert a force for returning to a posture parallel to the substrate 1.

For example, if the mirror 51 tilts toward the address electrode 12 on the substrate side and the upper address electrode 32 as illustrated in FIG. 3A, the electro-optical device 100 enters an ON state in which the light emitted from the light source unit 1002 is reflected toward the projection optical system 1004 by the mirror 51. In contrast to this, if the mirror 51 tilts toward the address electrode 13 on the substrate side and the upper address electrode 33 as illustrated in FIG. 3B, the electro-optical device 100 enters an OFF state in which the light emitted from the light source unit 1002 is reflected toward a light absorption device 1005 by the mirror 51. In the OFF state, the light is not reflected toward the projection optical system 1004. The driving is performed by each of the plurality of mirrors 51, and as the result, the light emitted from the light source unit 1002 is modulated into image light by the plurality of mirrors 51, is projected from the projection optical system 1004, and thereby the image is displayed.

A yoke of a flat plate shape facing the address electrodes 12 and 13 on the substrate side is provided as one piece with the torsion hinge 35, and the mirror 51 can also be driven by using an electrostatic force which operates between the address electrodes 12 and 13 on the substrate side and the yoke, in addition to an electrostatic force which is generated between the upper address electrodes 32 and 33 and the mirror 51.

Detailed Configuration of Electro-Optical Device 100

Figure 4:
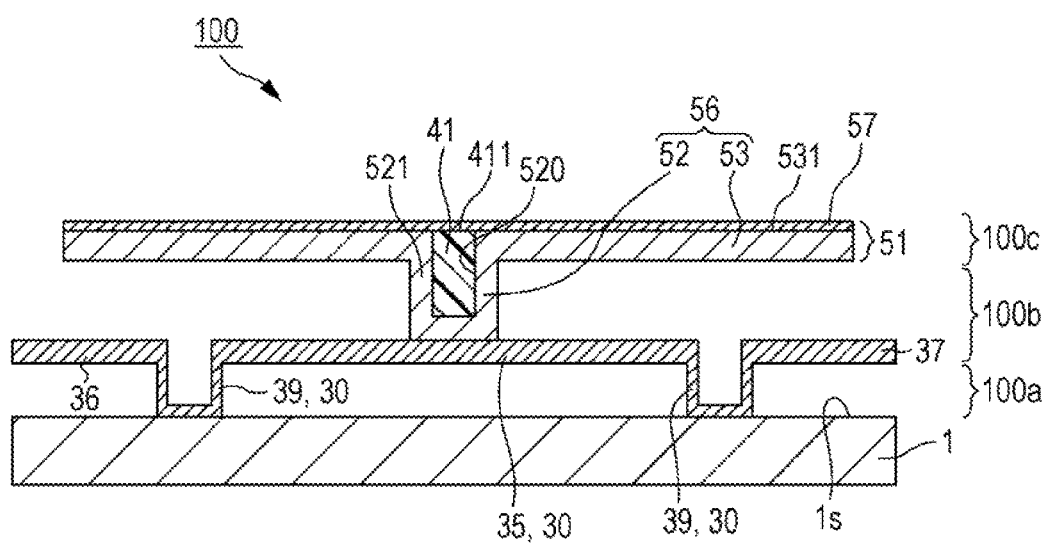
FIG. 4 is a cross-sectional view illustrating a specific configuration of the electro-optical device which employs an embodiment of the invention.

FIG. 4 is a cross-sectional view illustrating a detailed configuration of the electro-optical device 100 which employs one or more embodiments of the invention. FIG. 4 illustrates only the second portion 100b and the third portion 100c of the electro-optical device 100. Illustrating of the first portion 100a which includes the bias electrode 11 on the substrate side and the address electrodes 12 and 13 on the substrate side is omitted. In addition, FIG. 4 illustrates the mirror support post (second support post) 52 and the torsion hinge (twist hinge) 35 or the like for one mirror 51 among the plurality of mirrors 51 which are formed in the electro-optical device 100.

As illustrated in FIG. 4, the electro-optical device 100 includes the torsion hinge 35 with conductivity which is supported on the substrate 1 through the hinge support post 39 with conductivity on one surface is of the substrate 1. In the present embodiment, the hinge support post 39 and the torsion hinge 35 are formed of a metal layer (first conductive film 30 which will be described later) of one piece, and the hinge support post 39 protrudes from the metal layer (first conductive film 30) toward the substrate 1. In addition, the electro-optical device 100 includes the mirror support post 52 with conductivity protruded from the torsion hinge 35 toward a side opposite to the substrate 1, and the mirror 51 is coupled to an end portion 521 of the mirror support post 52 at a side opposite to the substrate 1. The mirror support post 52 faces a concave portion 520 at a side opposite to the substrate 1, but the inside of the concave portion 520 is filled with a resin 41. In the present embodiment, the resin 41 is formed of a photocurable resin.

The mirror 51 is configured by a laminated body in which a reflective layer 57 for a mirror is laminated on a conductive layer 56 for a mirror. The conductive layer 56 for a mirror includes the mirror support post 52 and a flat plate portion 53 (a flat plate) which extends from the end portion 521 of the mirror support post 52 and faces the substrate 1, as one piece. The reflective layer 57 for a mirror is laminated on a surface 411 of the resin 41 at a side opposite to the substrate 1, and on a surface 531 of the flat plate 53 of the conductive layer 56 for a mirror at a side opposite to the substrate 1 for a mirror.

Here, a height difference between a height from the torsion hinge 35 to the surface 411 of the resin 41 and a height from the torsion hinge 35 to the surface 531 of the flat plate 53 of the conductive layer 56 for a mirror is equal to or less than 0.2 μm. With a difference of such a degree, a decrease of utilization efficiency of light and a decrease of contrast due to scattering of a mirror is not noticeable. In the present embodiment, the surface 411 of the resin 41 and the surface 531 of the flat plate 53 of the conductive layer 56 for a mirror configure (e.g., form) a continuous plane by a CMP step which will be described later.

In the present embodiment, the conductive layer 56 for a mirror is thicker than the reflective layer 57 for a mirror. However, the sum of thicknesses of the conductive layer 56 for a mirror and the reflective layer 57 for a mirror is from 0.2 µm to 0.5 µm, and the thickness is the same as the thickness in a case in which the mirror 51 is formed as a single film.

Manufacturing Method of Electro-Optical Device

Description will be focused on steps in which the torsion hinge (twist hinge), the mirror support post (second support post), and the mirror are formed, among the manufacturing steps of the electro-optical device 100 which employs one or more embodiments of the invention, with reference to FIG. 2B, and FIG. 5A to FIG. 9E. FIGS. 5A to 5F, FIGS. 6A to 6C, and FIGS. 7A to 7D are step cross-sectional views illustrating a manufacturing method of the electro-optical device 100 which employs one or more embodiments of the invention. FIGS. 8A to 8F and FIGS. 9A to 9E are plan views of layers which are formed by the manufacturing steps of the electro-optical device 100 which employs one or more embodiments of the invention. FIG. 5A to FIG. 9E illustrate only the mirror support post 52 and the torsion hinge 35 for one mirror 51, among the plurality of mirrors 51 which are formed in the electro-optical device 100. In addition, in the following description, a relationship between the respective sections described with reference to FIG. 2B will also be appropriately described.

Figure 5A:
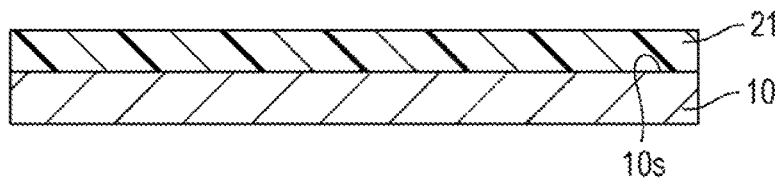
FIGS. 5A to 5F are step sectional views illustrating a manufacturing method of the electro-optical device which employs an embodiment of the invention.

First of all, as illustrated in FIG. 5A, in step ST1, the address circuit 14, the bias electrode 11 on the substrate side, and the address electrodes 12 and 13 on the substrate side, and the like, which are described with reference to FIG. 2B, are formed in a wafer 10 (substrate) which is configured by a silicon substrate.

Figure 5B:
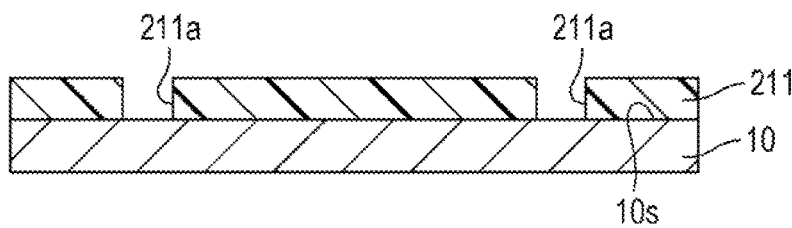

Subsequently, in step ST2, a photosensitive resist layer 21 which is formed of a positive-type organic photoresist or the like is formed on one surface 10s of a wafer 10, and thereafter, in step ST3 illustrated in FIG. 5B, exposure and development is performed for the photosensitive resist layer 21, and a first sacrificial layer 211 including an opening (first support opening) 211a for a hinge support post is formed. At this time, as illustrated in FIG. 8A, an opening 211b for an electrode post which is used for the electrode posts 321 and 331 of the upper address electrodes 32 and 33 is also formed. A thickness of the first sacrificial layer 211 is, for example, 1 µm, and an opening diameter of the opening 211a for a hinge support post is, for example, approximately 0.6 µm. The steps ST2 and ST3 are steps for forming the first sacrificial layer.

Figure 5C:
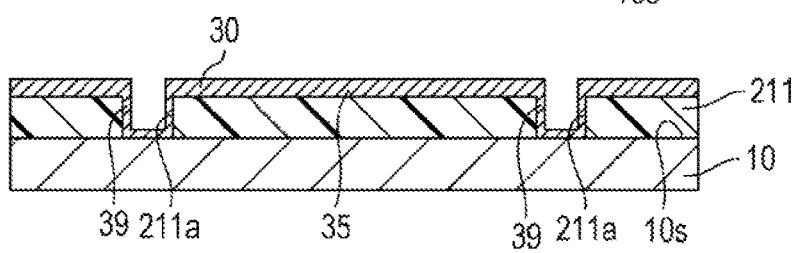

Subsequently, in step ST4 (step of forming a first conductive film) illustrated in FIG. 5C, a first conductive film 30 is formed on an entire surface (surface on a side opposite to the wafer 10) of the first sacrificial layer 211 (refer to FIG. 8B). At this time, the first conductive film is also formed on a wall surface and bottom surface of the opening for a hinge support post. The first conductive film 30 is, for example, a single film of an aluminum layer or a laminated film of an aluminum layer and a titanium layer, and a thickness thereof is, for example, 0.06 µm.

Subsequently, in step ST5 (first patterning step), in a state in which a resist mask is formed on a surface (surface on a side opposite to the wafer 10) of the first conductive film 30, the first conductive film 30 is patterned, and the hinge support post 39 is formed as one piece with the torsion hinge 35 by the first conductive film 30 remaining in the opening 211a for a hinge support post. At this time, as illustrated in FIG. 8C, the hinge arms 36 and 37 are formed. In addition, the upper address electrodes 32 and 33 are simultaneously formed, and the electrode posts 321 and 331 are formed in the opening 211b for an electrode post.

Figure 5D:
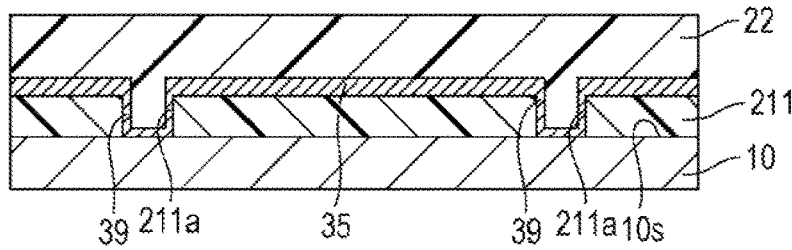
Figure 5E:
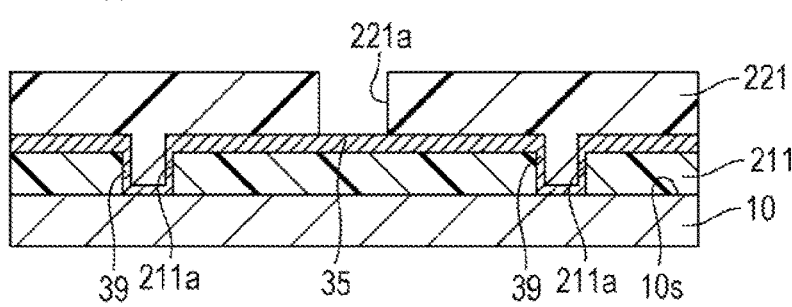

Subsequently, in step ST6 illustrated in FIG. 5D, a photosensitive resist layer 22 which is formed of a positive-type organic photoresist or the like is formed on the torsion hinge 35 at a side opposite to the wafer 10, and thereafter, in step ST7 illustrated in FIG. 5E, exposure and development is performed for the photosensitive resist layer 22, and a second sacrificial layer 221 including an opening (second support opening) 221a for a mirror support post is formed (refer to FIG. 8D). A thickness (height) of the second sacrificial layer 221 is, for example, 2 µm, and an internal diameter of the opening 221a for a mirror support post is, for example, 0.8 µm. The steps ST6 and ST7 are steps for forming the second sacrificial layer.

Figure 5F:
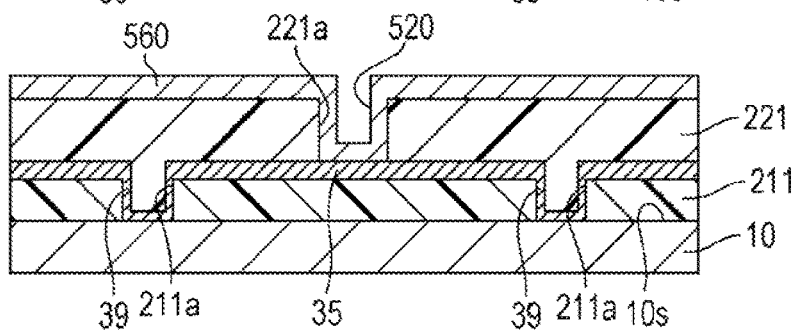

Subsequently, in step ST8 (step of forming second conductive film) illustrated in FIG. 5F, a second conductive film 560 is formed on the second sacrificial layer 221 at a side opposite to the wafer 10 (refer to FIG. 8E). The second conductive film 560 is, for example, a single film of an aluminum layer or a laminated film of an aluminum layer and a titanium layer, and a thickness thereof is, for example, 0.25 µm.

Subsequently, in step ST9 (filling step) illustrated in FIG. 6A, a resin 41 which is formed of liquid polyimide or the like is applied to the second conductive film 560 at a side opposite to the wafer 10, the resin 41 is applied to a concave portion 520 formed in the second conductive film by the opening 221a for a mirror support post (refer to FIG. 8F). Subsequently, the resin 41 is cured. Here, the resin 41 formed on an external side of the concave portion 520 is much thinner than the resin 41 formed in the inside of the concave portion 520, and is, for example, approximately 0.5 µm.

Figure 9A:
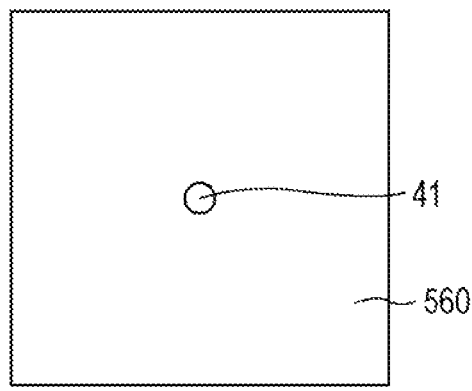
FIGS. 9A to 9E are plan views of layers formed by the manufacturing steps of the electro-optical device which employs an embodiment of the invention.

Subsequently, in step ST10 (planarization step) illustrated in FIG. 6B, surfaces of the second conductive film 560 and the resin 41 at a side opposite to the wafer 10 are planarized by the CMP method or the like, and the second conductive film 560 is exposed (refer to FIG. 9A). As a result of the planarization step, surfaces of the second conductive film 560 and the resin 41 at a side opposite to the wafer 10 configure a continuous plane.

At this time, the resin 41 formed on an external side of the concave portion 520 is much thinner than the resin 41 formed in the inside of the concave portion 520, and since the resin 41 has a low hardness, it is possible to perform a planarization step in a short amount of time.

Figure 9B:
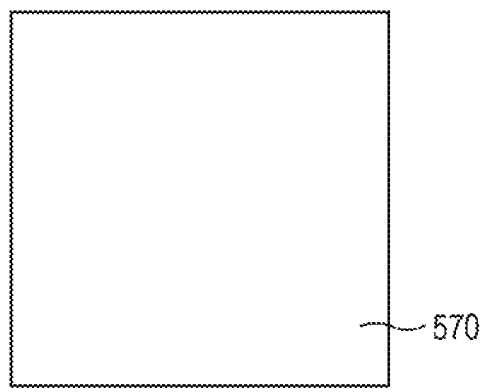
Figure 9C:
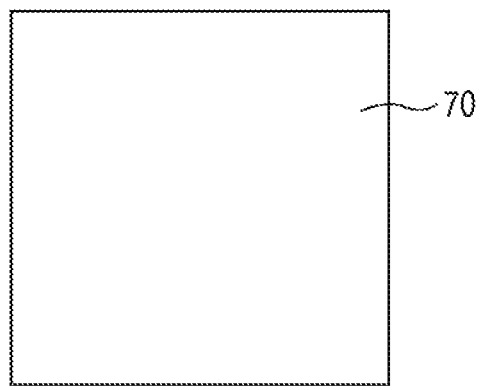

Subsequently, in step ST11 (step of forming reflective metal film) illustrated in FIG. 6C, a reflective metal film 570 is formed on the surfaces of the second conductive film 560 and the resin 41 at a side opposite to the wafer 10 (refer to FIG. 9B). The reflective metal film 570 is an aluminum film with a thickness of, for example, 0.05 µm.

Figure 7A:
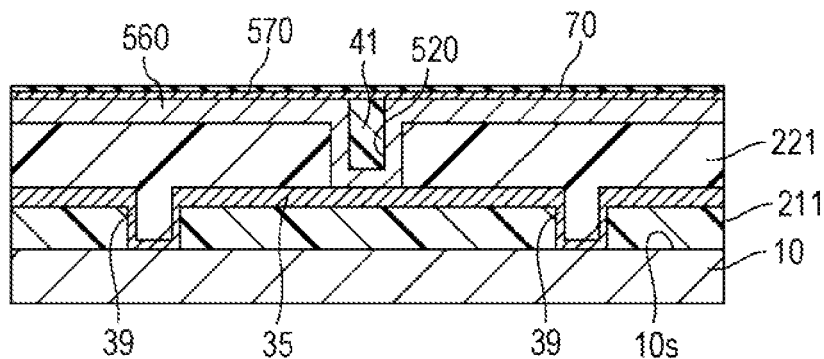
FIGS. 7A to 7D are step sectional views illustrating a manufacturing method of the electro-optical device which employs an embodiment of the invention.
Figure 7B:
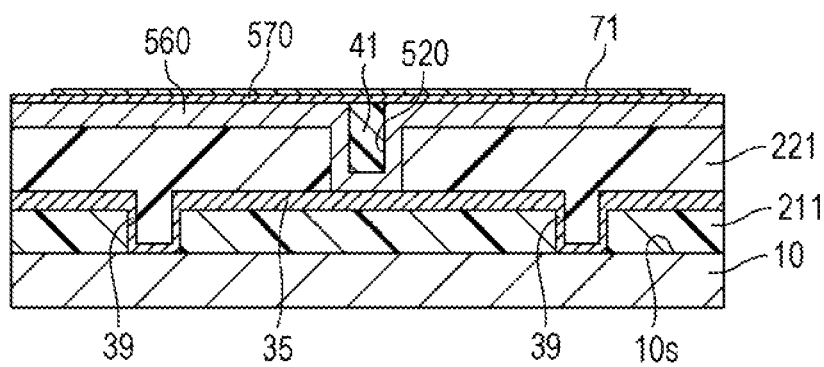
Figure 7C:
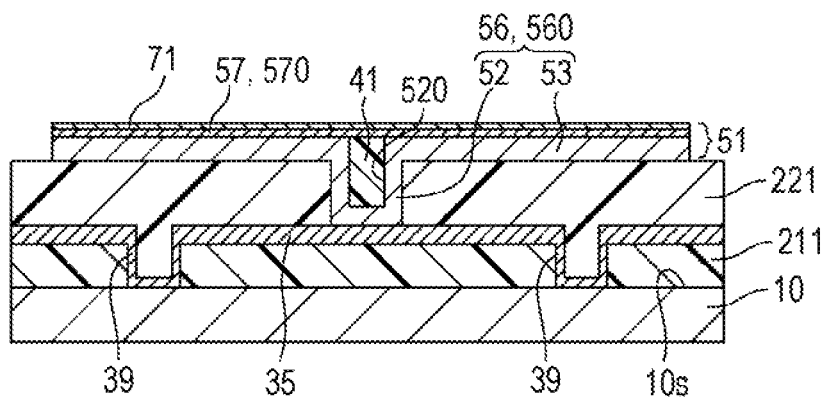
Figure 9D:
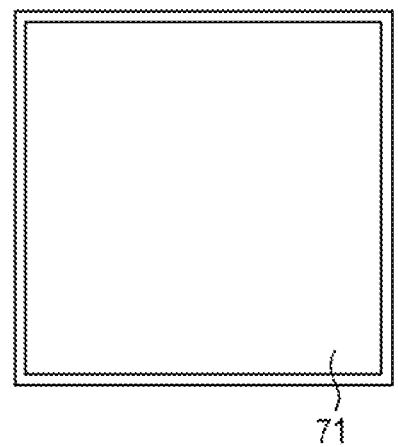
Figure 9E:
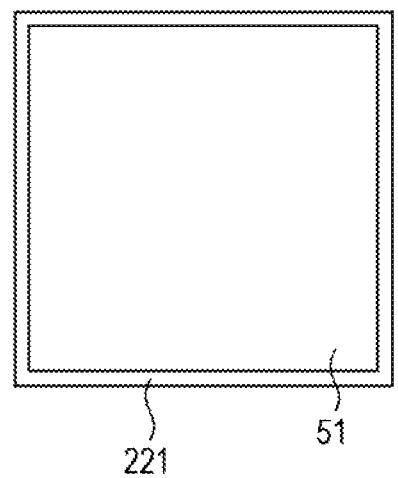

Subsequently, in step ST12 illustrated in FIG. 7A, an inorganic film 70 such as a silicon oxide film ($SiO_2$) is formed through a PEVCD method or the like (refer to FIG. 9C), and thereafter, in step ST13 illustrated in FIG. 7B, in a state in which a resist mask is formed on a surface (surface on a side opposite to the wafer 10) of the inorganic film 70, the inorganic film 70 is patterned, and an etching stopper layer 71 of a plane shape which is the same as the mirror 51 is formed (refer to FIG. 9D). Thereafter, the resist mask is removed. Subsequently, in step ST14 illustrated in FIG. 7C, the second conductive film 560 and the reflective metal film 570 are patterned by using the etching stopper layer 71 as a mask, and thereby the mirror 51 is formed (refer to FIG. 9E). As a result, the conductive layer 56 for a mirror is formed by a portion remaining in the second conductive film 560, and the reflective layer 57 for a mirror is formed by a portion remaining in the reflective metal film 570. The steps ST12, ST13, and ST14 are a second patterning step.

Subsequently, in step ST15, the wafer 10 is divided into a plurality of substrates 1, each having a size of a single piece.

Figure 7D:
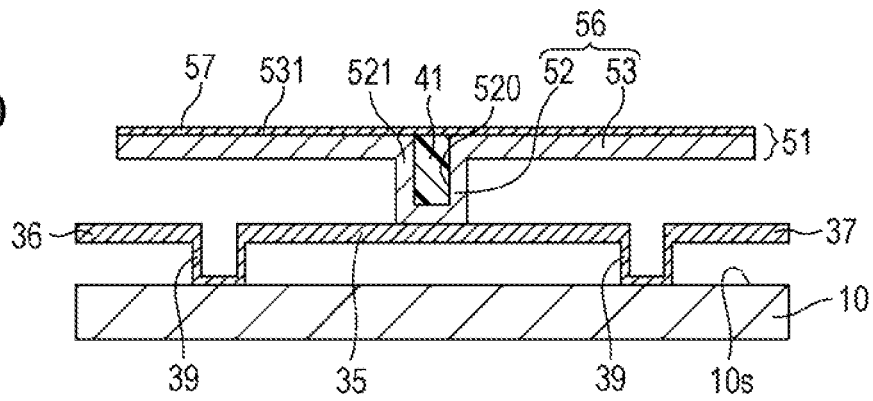

Subsequently, in step ST16 (step of removing a sacrificial layer) illustrated in FIG. 7D, the first sacrificial layer 211 and the second sacrificial layer 221 are removed by performing plasma etching or the like. At this time, the etching stopper layer 71 is removed. As a result, the electro-optical device 100 is obtained.

Main Effects of the Present Embodiment

As described above, in the present embodiment, the mirror support post (second support post) 52 faces the concave portion 520 at a side opposite to the substrate 1, but the concave portion 520 is filled with a resin. Accordingly, a large dent is hardly formed on a surface of the mirror 51. In addition, in the present embodiment, the reflective metal film 570 is formed on a surface which becomes a continuously planarized surface through a planarization process, and thus a dent is hardly formed on the surface of the mirror 51. Thus, it is possible to increase utilization efficiency of light, and to prevent contrast from being lowered due to scattering at the mirror 51.

In addition, since the conductive layer 56 for a mirror is thicker than the reflective layer 57 for a mirror, electrical resistance of the mirror 51 becomes small, and thus it is possible to reliably apply a proper potential to the mirror 51. Even in this case, the sum of the thicknesses of the conductive layer 56 for a mirror and the reflective layer 57 for a mirror is from 0.2 μm to 0.5 μm, and thus the thickness is the same as the thickness in a case in which the mirror 51 is formed as a single film, and the mirrors 51 is not heavy. Therefore, it is possible to properly drive the mirror 51.

Modification Example of the Embodiment

In the above-described embodiment, it is preferable that a photosensitive resin such as a photosensitive polyimide or the like is used as the resin 41, and in this case, the resin 41 can remain only in the concave portion 520 by the exposed pattern. Thus, in a case in which a height difference between a height from the torsion hinge 35 to a surface of the resin 41 at a side opposite to the substrate 1, and a height from the torsion hinge 35 to a surface of the flat plate 53 of the conductive layer 56 for a mirror at a side opposite to the substrate 1 is equal to or less than 0.2 μm, a decrease of utilization efficiency of light and a decrease of contrast due to scattering at the mirror is not noticeable. Thus, it is possible to omit the planarization process.

In addition, it is preferable that the resin 41 has conductivity, and in this case, electrical resistance of the mirror 51 is substantially small, and thus, it is possible to reliably apply a proper potential to the mirror 51. It is possible to use polyacetylene, polythiophene, polypyrrole, polyaniline, or the like as a specific material of the resin 41. In addition, if the resin 41 has conductivity, a stable material, which has a larger electrical resistance than that of aluminum, can be used for the conductive layer 56 for a mirror. It is possible to use titanium, titanium nitride or the like as a specific material of the conductive layer 56 for a mirror.

What is claimed is:

1. An electro-optical device comprising:
a substrate;
a torsion hinge disposed above the substrate;
a flat plate disposed above the torsion hinge;
a supporting portion in which a resin is filled protrudes from the flat plate toward the torsion hinge; and
a reflective layer which completely covers a surface of the flat plate and the resin, the reflective layer contacting the resin,
wherein a height difference between a height from the torsion hinge to a surface of the resin at a side opposite to the substrate and a height from the torsion hinge to a surface of the flat plate at a side opposite to the substrate is equal to 0.2 μm or less.

2. The electro-optical device according to claim 1, wherein a surface of the resin at a side opposite to the substrate and a surface of the flat plate at a side opposite to the substrate form a continuous plane.

3. The electro-optical device according to claim 1, wherein the resin has conductivity.

4. The electro-optical device according to claim 1, wherein the resin is formed of a photosensitive resin.

5. An electronic apparatus comprising:
the electro-optical device according to claim 1; and
a light source unit which emits light source light to the reflective layer.

6. An electronic apparatus comprising:
the electro-optical device according to claim 2; and
a light source unit which emits light source light to the reflective layer.

7. An electronic apparatus comprising:
the electro-optical device according to claim 3; and
a light source unit which emits light source light to the reflective layer.

8. An electronic apparatus comprising:
the electro-optical device according to claim 4; and
a light source unit which emits light source light to the reflective layer.

9. The electro-optical device according to claim 1, wherein the reflective layer directly contacts the resin.

10. The electro-optical device according to claim 1, wherein the resin is formed of a photocurable resin.

* * * * *